United States Patent [19]
Skibinski et al.

[11] Patent Number: 5,990,654
[45] Date of Patent: Nov. 23, 1999

[54] APPARATUS FOR ELIMINATING MOTOR VOLTAGE REFLECTIONS AND REDUCING EMI CURRENTS

[75] Inventors: Gary L. Skibinski, Milwaukee; Henrik B. Nielsen, Germantown, both of Wis.

[73] Assignee: Allen-Bradley Company, LLC, Milwaukee, Wis.

[21] Appl. No.: 09/010,454

[22] Filed: Jan. 21, 1998

[51] Int. Cl.[6] ........................................... H02P 5/00
[52] U.S. Cl. ..................... 318/800; 307/105; 363/41; 363/96
[58] Field of Search ................... 318/792–815; 307/105; 361/111; 363/39, 40, 41, 44–47, 50, 52, 56, 95, 96, 126

[56] References Cited

U.S. PATENT DOCUMENTS

| | | | |
|---|---|---|---|
| 3,668,507 | 6/1972 | Kadomsky et al. | 363/126 |
| 3,675,110 | 7/1972 | Kelley, Jr. | 363/50 |
| 4,206,395 | 6/1980 | Okuyama et al. | 318/716 |
| 4,330,817 | 5/1982 | Avar et al. | 363/96 |
| 4,622,474 | 11/1986 | Christl et al. | 307/105 |
| 4,700,288 | 10/1987 | Baraban et al. | 363/138 |
| 4,864,484 | 9/1989 | Krueger et al. | 363/45 |
| 4,939,486 | 7/1990 | Bergdahl et al. | 333/175 |
| 5,251,120 | 10/1993 | Smith | 363/44 |
| 5,686,806 | 11/1997 | Hibbard | 318/800 |

*Primary Examiner*—David Martin
*Attorney, Agent, or Firm*—Michael A. Jaskolski; John M. Miller; John J. Horn

[57] ABSTRACT

An apparatus for essentially eliminating transmission line reflected waves and standing waves and for reducing common mode transient currents for use with a three phase motor controller, the apparatus including a common mode choke in series with a filter network between an inverter and a motor, the filter including three inductors and three resistors, the inductors and resistors together forming three inductor-resistor pairs, each pair including an inductor in parallel with a resistor, each pair linked to a separate one of three transmission supply lines which link the inverter to the motor, values of the resistors and inductors selected according to transmission line theory.

9 Claims, 9 Drawing Sheets

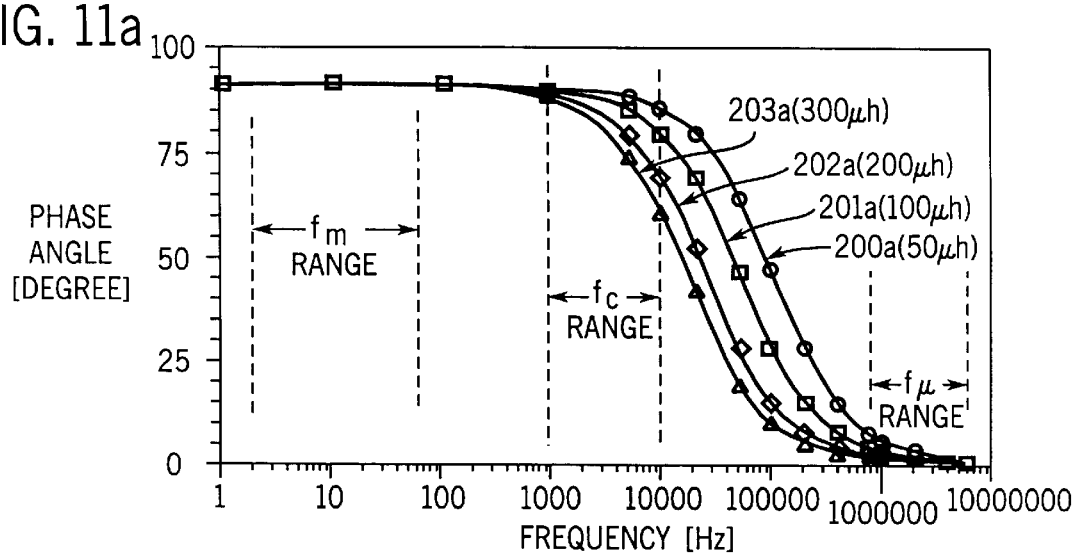
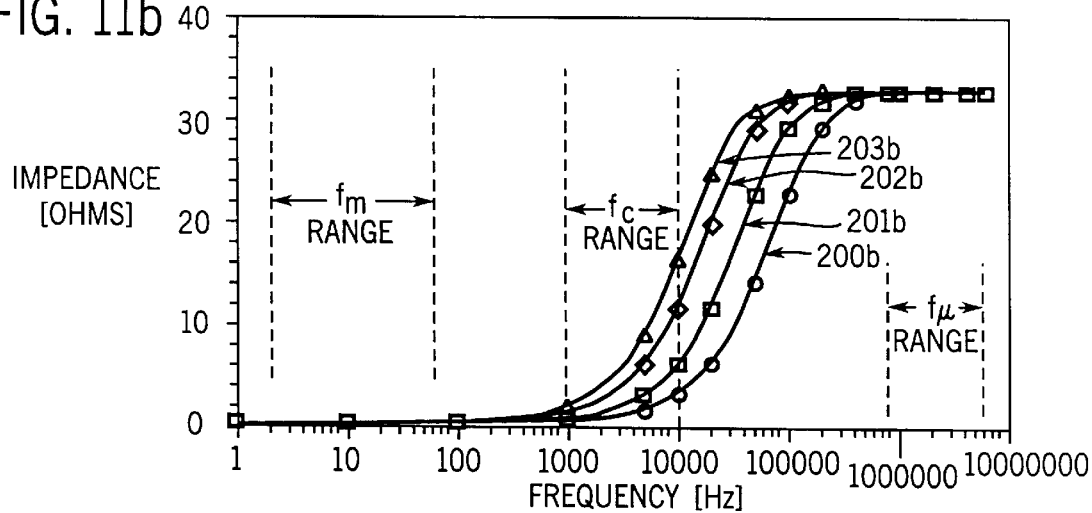
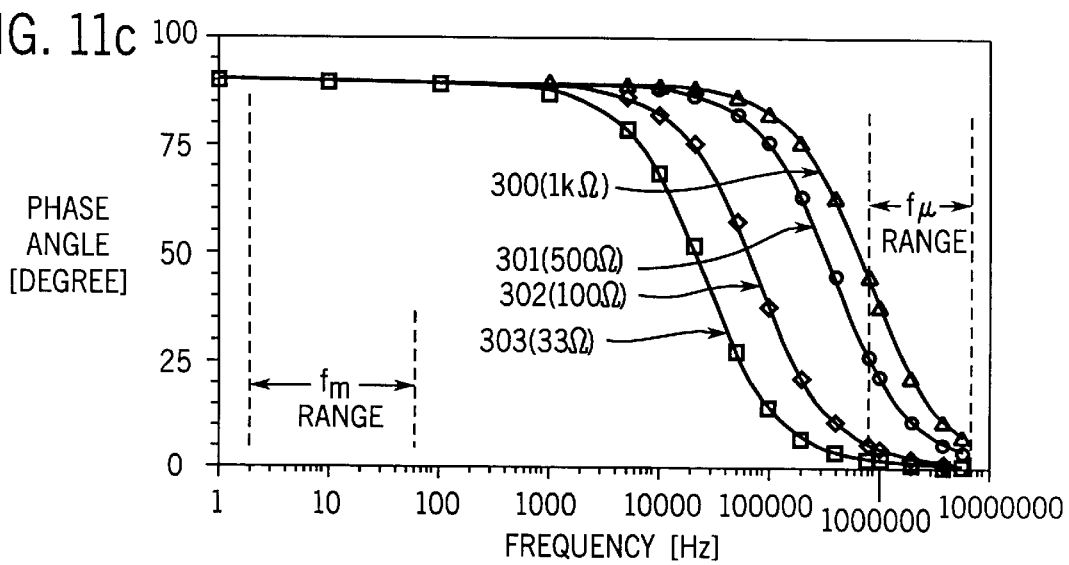

APPARATUS FOR ELIMINATING MOTOR VOLTAGE REFLECTIONS AND REDUCING EMI CURRENTS

BACKGROUND OF THE INVENTION

The present invention relates to three phase AC motor controllers and more particularly, to an apparatus for altering stator winding voltages to essential eliminate any overshoot voltage greater than a DC bus voltage magnitude.

One type of commonly designed induction motor is a three phase motor having three Y-connected stator windings. In this type of motor, each phase's stator winding is connected to an AC voltage source by a separate transmission line, the source generating currents therein. Often, an adjustable speed drive (ASD) will be positioned between the voltage source and the motor to control motor speed.

One commonly used type of ASD includes a PWM voltage source invertor (VSI). PWM VSIs operate by converting a DC voltage into a series of high frequency AC voltage pulses. PWM invertors can control the widths of the positive and negative phase portions of each pulse, thus producing a changing average voltage. All of the high frequency pulses are provided at motor terminals and their changing average over a period defines a fundamental low frequency alternating voltage at the terminals. The amplitude of the fundamental voltage can be controlled by adjusting the ratio of positive to negative phase portions of each high frequency pulse. The frequency of the fundamental voltage can be controlled by altering the period over which the average high frequency pulses alternate from positive to negative phase. Depending upon its design, a given PWM can produce a fundamental low frequency alternating voltage having a range of different frequencies to drive a motor at many different speeds, hence the term ASD.

Referring to FIG. 1, a transmission line 80 such as may be used as a supply line to an AC motor can be represented by a "π" distributed equivalent circuit per unit length of cable. The n distributed circuit includes a plurality of inductors 81, resistors 71, and capacitors 82, the inductors 81 and resistors 82 arranged in series and the capacitors 71 arranged in parallel, one capacitor 82 connecting a point between each resistor and inductor pair to a "reference return" line 76. Looking back along supply line 80 from a stator terminal 20, 21, or 22 toward a voltage source 15, a supply line 80 will have a characteristic impedance $Z_0$ in ohms equal to $$\sqrt{\frac{L}{C}}$$

where L is the line inductance 81 in Henrys per meter and C is the line capacitance 82 in Farads per meter. As a high frequency voltage pulse $e^+$ emitted from the PWM VSI travels along the supply line 80, it produces a current $i^+ = e^+/Z_0$.

The high frequency equivalent circuit of a stator winding 75, like a transmission line, can also be represented by a n distributed equivalent circuit made up of capacitors, inductances and resistors. This circuit model is different from the standard low frequency (60 Hz) induction motor model. Therefore, the stator winding 75 responding to the high frequency voltage pulses also has a high frequency characteristic impedance $Z_t$, where the supply line is terminated. At termination it must be true that:

$$\frac{Total\ e}{Total\ i} = Z_t \qquad \text{Eq. 1}$$

where Total e is the voltage across the stator winding and Total i is the current through the stator winding.

When high frequency voltage pulses are produced, unless $Z_t = Z_0$, part of the incident wave $e^+$ is reflected back toward the voltage supply 15 thus producing a reflected voltage $e^-$. The reflected voltage $e^-$ and associated reflected current $i^-$ are related to the line impedance by the equation $i^- = e^-/Z_0$. At the termination, Equation 1 can be rewritten as:

$$\frac{e_t^+ + e_t^-}{i_t^+ + i_t^-} = Z_t \qquad \text{Eq. 2}$$

where the subscript t refers to values at the point of termination at the stator winding.

Equation 2 can be rewritten in terms of $Z_0$ as $$\frac{e_t^+ + e_t^-}{e_t^+/Z_0 - e_t^-/Z_0} = Z_t \qquad \text{Eq. 3}$$

Solving Equation 3 for a ratio of reflected to incident voltage:

$$\frac{e_t^-}{e_t^+} = \frac{Z_t - Z_0}{Z_t + Z_0} = K \qquad \text{Eq. 4}$$

where the ratio K is called the reflection co-efficient. K will be zero and there will be no reflection at the termination only when the terminating impedance $Z_t$ is equal to the characteristic impedance $Z_0$ of the line.

Often, when the terminating impedance $Z_t$ is different than the line impedance $Z_0$, the reflected waves $e^-$ and incident waves $e^+$ combine to form standing waves or overvoltages having an amplitude that can be as much as twice the amplitude of the incident wave, thus forming an overvoltage surge at the motor terminals. Importantly, the stator high frequency terminal impedance $Z_t$ is usually quite different and several orders of magnitude greater than the line impedance $Z_0$. Thus, voltage surges having amplitudes which are twice the DC bus voltage amplitude are a common phenomenon in the motor control industry.

Over voltage magnitude depends upon the characteristic motor termination impedance $Z_t$, cable impedance $Z_0$, the cable length and the steep front rise and fall times of the high frequency PWM pulses and may be estimated using standard transmission line standing wave theory. The rise time of the steep front high frequency PWM pulses is essentially fixed by the VSI semiconductor device switching times and varies with device technology as shown in Table I. An equivalent switch risetime frequency ($f_u$) and wavelength ($\lambda$) of the traveling incident wave $e^+$ may be defined using Equations (5) and (6) below.

$$f_u = \frac{1}{\pi t_{rise}} \qquad \text{Eq. 5}$$

$$\lambda = \frac{c}{f_u} \qquad \text{Eq. 6}$$

where c is the speed of light, and trise is the rise time associated with the semiconductor device. A critical cable length equal to or greater than $\lambda/4$ results in twice the amplitude of the incident wave at the motor terminals when $Z_r >> Z_0$, as is often the case. From standing wave theory, a cable length less than ($\lambda/10$) will replicate the invertor produced high frequency PWM pulse without over voltage at the motor terminals.

TABLE I

Effect of Invertor Semiconductors on AC Motor Voltage Surge

| Semiconductor Device Type | Rise Time | Voltage Surge At Motor | |
|---|---|---|---|
| | | Twice $V_{DC}$ at ($\lambda/4$) | $V_{DC}$ Bus at ($\lambda/10$) |
| Gate Turnoff Thyristor (GTO) | 1 ms | 774 ft | 309 ft |
| Bipolar Junction Transistor (BJT) | 0.3 ms | 386 ft | 155 ft |
| Insulated Gate Bipolar Transistor (IGBT) | 0.07 ms | 54 ft | 29 ft |

Presently, the widespread use of IGBT technology with its fast rise and fall switching times produces twice overvoltages at the motor terminals for drive-motor cable distances exceeding 54 ft. Since this distance is exceeded in practically 100% of all drive applications, there is now an urgent need to conceive a simple yet effective apparatus used with AC motors for eliminating line voltage reflections.

In addition to twice overvoltages, overvoltages greater than twice the DC bus voltage level are caused by fast IGBT switching frequencies and fast IGBT dv/dt rise times interacting with two different common switch modulating techniques referred to as "double pulsing" and "polarity reversal".

Referring to FIG. 2, double pulsing will be described in the context of an IGBT inverter generated line-to-line voltage $V_i$ applied to a line cable and a resulting motor line-to-line terminal voltage $V_m$. Initially, at time $\tau_1$, the line is shown in a fully-charged condition ($V_i(\tau_1)=V_m(\tau_1)=V_{DC}$). A transient motor voltage disturbance is initiated in FIG. 2 by discharging the line at the inverter output to zero voltage, starting at time $\tau_2$, for approximately 4 $\mu$sec. The pulse propagation delay between the inverter terminals and motor terminals is proportional to cable length and is approximately 1 $\mu$sec for the assumed conditions. At time $\tau_3$, 1 $\mu$sec after time $\tau_2$, a negative going $V_{DC}$ voltage has propagated to the motor terminals. In this example, a motor terminal reflection coefficient Kt is nearly unity. Thus, the motor reflects the incoming negative voltage and forces the terminal voltage $V_m$ to approximately negative bus voltage:

$$V_m(\tau_3)=V_m(\tau_1)-V_{DC}(1+Kt) \approx -V_{DC} \qquad \text{Eq. 7}$$

A reflected wave $(-V_{DC})$ travels from the motor to the inverter in 1 $\mu$sec and is immediately reflected back toward the motor. Where an inverter reflection coefficient Ki is approximately negative unity, a positive $V_{DC}$ pulse is reflected back toward the motor at time $\tau_4$. Therefore, at time $\tau_4$ the discharge at time $\tau_2$ alone causes a voltage at the motor terminal such that:

$$V_m(\tau_4)=V_m(\tau_1)-V_{DC}(1+Kt)-V_{DC}KiKt(1+Kt) \approx V_{DC} \qquad \text{Eq. 8}$$

In addition, at time $\tau_4$, with the motor potential approaching $V_{DC}$ due to the $\tau_2$ discharge, the inverter pulse $V_i(\tau_4)$ arrives and itself recharges the motor terminal voltage to $V_{DC}$. Pulse $V_i(\tau_4)$ is reflected by the motor and combines with $V_m(\tau_4)$ to achieve a peak value of approximately three times the DC rail value:

$$V_m(\tau_4+)=V_m(\tau_1)-V_{DC}(1+K_t)-V_{DC}K_iK_i(1+K_t)+V_i(\tau_4)(1+K_t) \approx 3V_{DC} \qquad \text{Eq. 9}$$

Referring to FIG. 3 polarity reversal will be described in the context of an IGBT inverter generated line-to-line voltage $V_{il}$ and a resulting motor line-to-line voltage $V_{ml}$. Polarity reversal occurs when the firing signal of one supply line is transitioning into overmodulation while the firing signal of another supply line is simultaneously transitioning out of overmodulation. Overmodulation occurs when a reference signal magnitude is greater than the maximum carrier signal magnitude so that the on-time or off-time of a switch is equal to the duration of the carrier period. Polarity reversal is common in all types of PWM inverter control.

Initially, the inverter line-to-line voltage $V_{il}(\tau_5)$ is zero volts. At time $\tau_6$, the inverter voltage $V_{il}(\tau_6)$ is increased to $V_{DC}$ and, after a short propagation period, a $V_{DC}$ pulse is received and reflected at the motor terminals thus generating a 2 $V_{DC}$ pulse across associated motor lines. At time $\tau_7$, the line-to-line voltage switches polarity (hence the term polarity reversal) so that the inverter voltage $V_{il}(\tau_7)$ is equal to $-V_{DC}$ when the line-to-line motor voltage $V_{ml}(\tau_7)$ has not yet dampened out to a DC value (i.e. may in fact be 2 $V_{DC}$). After a short propagation period, the $-V_{DC}$ inverter pulse reaches the motor, reflects, and combines with the inverter reflected pulse $-V_{DC}$ and the positive voltage 2 $V_{DC}$ on the motor. The combination generates an approximately $-3$ $V_{DC}$ line-to-line motor voltage $V_{ml}(\tau_8)$ at time $\tau_8$.

In reality, the amplitude of overvoltages will often be less than described above due to a number of system variables including line AC resistance damping characteristics, DC power supply level, pulse dwell time, carrier frequency $f_c$ modulation techniques, and less than unity reflection coefficients (Kt and Ki).

Voltage surges are generally recognized as undesirable for a plurality of reasons. For example, the supply lines that supply the voltage to a motor are electrically insulated to withstand a specified level of voltage. Under normal circumstances where supply line voltage is less than the specified level, supply line insulation functions properly for much longer than the life of the motor. However, the useful life of a supply line can be cut short where the voltage passing through the supply line regularly exceeds the level of voltage for which the supply line was designed.

Voltage surges caused by reflected waves often present voltage having an amplitude high enough to damage supply line insulation. Insulation failure can lead to high voltage short circuit problems which can, in turn, lead to costly damage of other motor components as well.

In addition to damaging line insulation, a voltage surge can directly damage a stator winding if the surge penetrates, and is mostly absorbed by, the initial coils of the stator winding. A stator winding is an iterative structure having a plurality of series connected winding coils.

When a voltage enters a stator winding, the voltage propagates along the winding beginning with the first coil. Some of the voltage is absorbed in the first coil and the rest is propagated onto the latter coils. Ideally, the voltage is designed to be distributed evenly among the coils under steady sinewave voltage operation.

In reality, however, because of the reflected voltage waves impressed on the invertor square wave pulse shape of a voltage surge, voltage distribution can be unevenly distributed and result in undue and potentially damaging dielectric stress on certain of the motor windings. Modern semiconductor switches used in PWM invertors and other types of invertors produce voltage pulses having relatively fast rise times and thus having steep front ends. A voltage surge enhances the vertical aspect of the front end of each pulse and produces an exceedingly steep front end.

When an exceedingly steep voltage surge of twice DC bus amplitude enters a stator winding, the voltage difference across the first few coils is extremely high as the potential difference across adjacent windings increases rapidly. The turn-to-turn stray capacitance of the first coil is the first parasitic component to encounter the incoming voltage surge and takes the brunt of the surge before an attenuated voltage wave propagates onto the latter coils.

The stator winding insulation, like the line insulation, can be irreparably damaged by repetitive twice amplitude voltage surges occurring at the invertor semiconductor switching rate, typically 2 KHZ to 15 KHZ with IGBT invertors. Insulation burnout is particularly problematic in the case of stator winding insulation as winding insulation must be minimized to maintain a compact motor design.

The industry has employed several different hardware solutions to reduce overvoltages. According to a simple reactor solution, three inductors are provided, a separate one of the inductors placed in series with each of the three supply lines between an ASD and three motor terminals.

According to another solution a sinewave filter is linked to the supply lines wherein this filter includes three capacitors and three inductors. A separate inductor is positioned in series with each supply line. One capacitor is linked between each pair of supply lines.

According to yet another solution a dv/dt filter is linked to the three supply lines between an ASD drive and a motor. The filter includes three inductors, three resistors and three capacitors. Again, a separate inductor is positioned in series with each supply line. A separate resistor is linked in series with a separate capacitor between each pair of supply lines.

According to one other solution a resistor-inductor-diode (RLD) filter is linked to the supply lines. The RLD filter includes six diodes, three inductors and two resistors. A separate inductor is positioned in series with each supply line. The diodes are arranged in series pairs to form three parallel diode legs between positive and negative terminals. A node between the diodes of each leg is linked to a separate supply line and the positive and negative terminals are connected through separate resistors to positive and negative DC drive buses, respectively.

While each of the overvoltage solutions identified above effectively reduce overvoltages, each solution suffers from at least one and typically a plurality of the following shortcomings. Among other shortcomings, the solutions above can result in a 3 to 5% voltage drop at the motor terminals at rated current (e.g. the reactor and dv/dt filter solutions), are configured using relatively large components and therefore require large volumes, require a large number of components and therefore are relatively expensive to configure, provide only poor/slow dynamic response to a motor load, create periodic instability, cause line-to-line neutral voltage to be undamped, cause resonant conditions in line-to-neutral voltage, cause rise times which vary as a function of cable length, and/or can only be used with specific (e.g. short) cable lengths.

One other solution for dealing with twice overvoltage is described in U.S. patent application Ser. No. 08/799,737 entitled APPARATUS USED WITH AC MOTORS FOR ELIMINATING LINE VOLTAGE REFLECTIONS filed by the present inventor on Feb. 12, 1997 which is assigned to the assignee of the present case and is incorporated herein by reference. According to that solution, a terminator network is linked to three motor voltage supply lines to essentially eliminate overvoltages. The terminator includes at least three resistors and three capacitors, one resistor and one capacitor arranged in series between each two supply lines. The terminator overcomes many of the shortcomings described above with respect to other prior art solutions but still has some disadvantages. First, the terminator is linked to a control system at the terminal end of the supply lines. While this is not a problem in many applications, in many other applications the line sections adjacent motor terminal might not be accessible or might be located in a hazardous environment. In addition, the terminator cannot clamp line-to-neutral voltage on a solid grounded system.

Thus, it would be advantageous to have a relatively compact apparatus for efficiently and inexpensively eliminating or substantially reducing voltage surges due to reflected waves which could be located in an accessible and non-hazardous location.

BRIEF SUMMARY OF THE INVENTION

The inventive apparatus virtually eliminates destructive reflected waves and also functions to reduce inverter output common mode electromagnetic interference (EMI) line-to-ground current noise. To this end, the inventive apparatus includes a plurality of phase inductors and resistors in combination with a common mode choke (CMC). Specifically, given a three-line supply configuration, the apparatus includes three inductors and three resistors. A separate inductor is placed in series with each supply line and a separate resistor is placed in parallel with each inductor. Each supply line is linked to the CMC. Importantly, each inductor-resistor pair is linked between an inverter and an associated line (i.e., is at the inverter end of the line as opposed to the terminal end). By selecting inductor-resistor pairs appropriately, peak line voltage magnitude can be maintained essentially near the maximum output voltage of the inverter (i.e. near a DC bus voltage $V_{dc}$).

In operation, when an inverter generates a pulse, when the pulse reaches an associated inductor-resistor pair, initially the inductor has a high impedance so that current is forced through the resistor. The magnitude of the voltage across the resistor and hence on an attached supply line during this initial period of high inductor impedance can be controlled by selecting the resistor value. Preferably, the resistor is chosen such that the supply line voltage during this initial period rises to approximately half the maximum inverter output voltage.

Eventually, inductor impedance decreases, current begins to flow through the inductor and the parallel resistor is effectively removed from the circuit (i.e., effectively becomes an open circuit). At this time, the line voltage rises to the level of the inverter output voltage and is provided to an associated motor terminal. The duration of the initial period of high inductor impedance is selectable by choosing the inductor value.

When a pulse is received at the motor terminal, if any portion of the pulse is reflected as is typical, when the reflected pulse reaches the inductor-resistor pair, once again the inductor has a high impedance and the reflected pulse is dissipated by the resistor. Thus, the terminal reflected pulse or backward traveling pulse cannot be re-reflected thereby increasing line voltage.

Thus, one object of the invention is to essentially eliminate or minimize reflected waves on supply lines. The inventive apparatus advantageously solves both the 2 pu and 3 pu reflected wave voltage problems, for various combinations of drive carrier frequency and very long cable length by maintaining near ideal drive bus voltage magnitude for reflected wave motor voltage so that the safe operating envelope of conventional motor insulation is not exceeded. By limiting the reflected wave peak voltage value to the DC bus voltage $V_{dc}$, the pulse rise time needs to be only minimally sloped to be within the safe operating envelope so that minimal pulse distortion occurs. Another objective is to achieve the aforementioned object simply and inexpensively. To this end, minimal components are required and the required components are inexpensive.

One other object is to provide an apparatus which meets the above objects, yet can advantageously be positioned adjacent an inverter instead of at the terminal ends of supply lines. While the inventive apparatus can be used at the terminal end of a supply line, it can also be used at the inverter end and is thus easy to implement into existing drive/motor systems.

Another object is to meet the above objects in an efficient manner. To this end, the inductors are chosen such that the high impedance inductor period is minimized, thereby ensuring that only minimal energy is dissipated by the parallel resistors.

The phase resistors and the CMC operate together to reduce the magnitude of noise in the line-to-ground current without appreciably affecting the optimum line-to-line waveforms determined by the parallel inductors and resistors.

Another advantage of the inventive apparatus is that the low impedance of the apparatus at low fundamental output frequencies also allows AC drive auto-tune procedures to be done without disconnecting the apparatus. Drive auto tune encompasses identifying motor stator winding inductance and resistance values. In addition, the inventive apparatus is designed using transmission line theory to match inverter output impedance to cable surge impedance. Cable impedance is approximately constant over the I hp to 500 hp range. Therefore, it is possible to use the components selected in a single horsepower configuration (e.g. 5 hp) to achieve design goals of eliminating reflected waves and reducing EMI currents with minimal performance degradation for all horsepowers within the 1 to 500 horsepower range.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 11a is a graph illustrating resistor-inductor phase angle vs. frequency with the resistor fixed at 33 ohms and various inductor values; FIG. 11b shows resistor-inductor impedance magnitude vs. frequency with the resistor fixed at 33 ohms and various inductor values; and FIG. 11c is similar to FIG. 11a, albeit with a fixed inductor of 200 uh and varying resistor values;

DETAILED DESCRIPTION OF THE INVENTION

Figure 1:
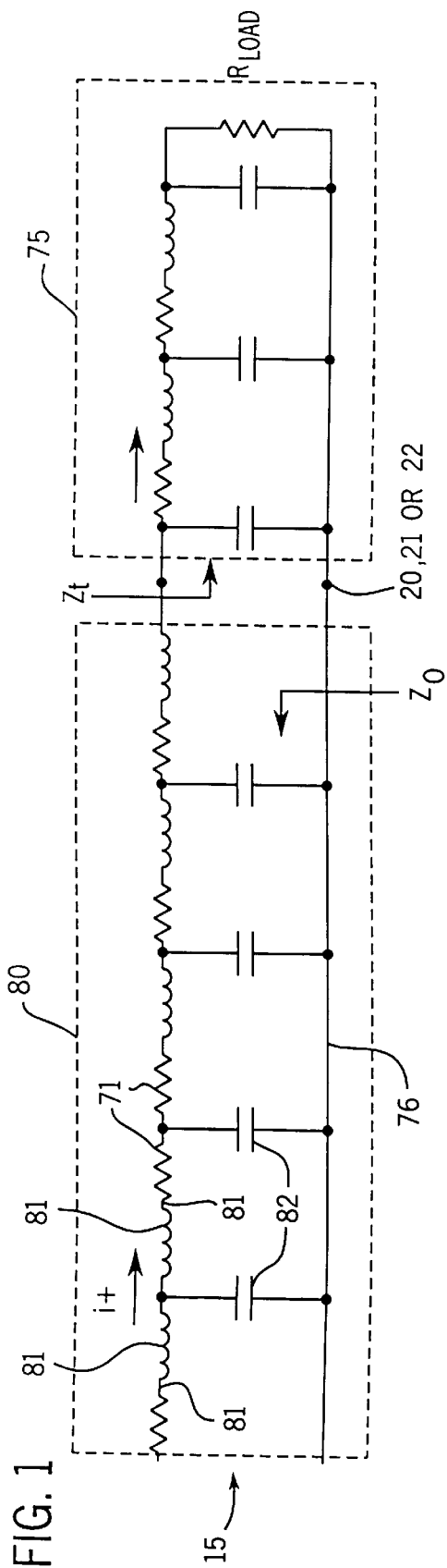
FIG. 1 is a schematic diagram of a high frequency equivalent circuit of both a supply line and a stator winding.
Figure 2:
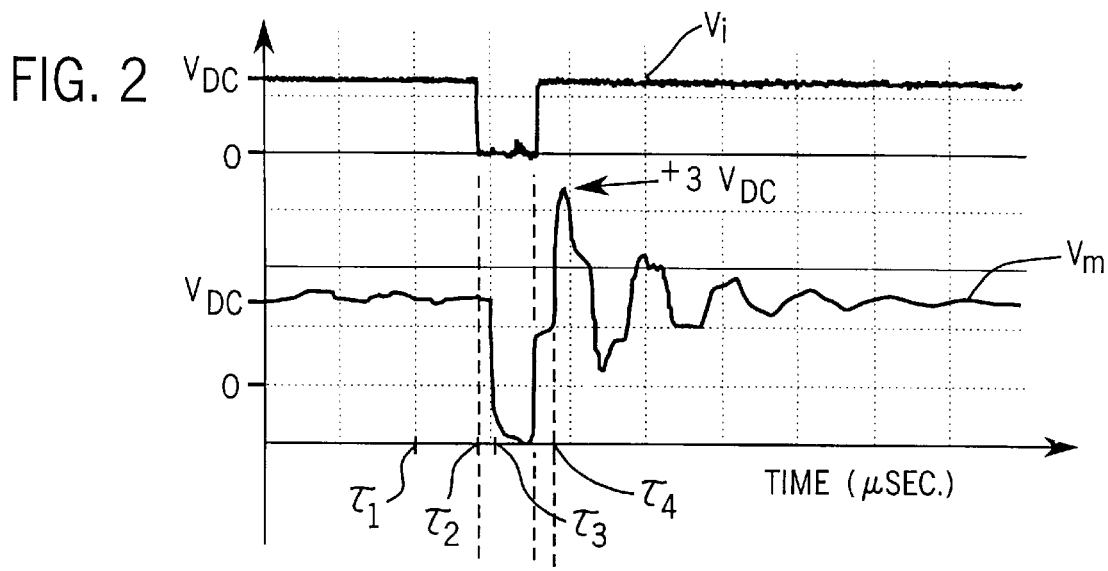
FIG. 2 is a graph illustrating greater than twice over voltage on a motor due to inverter modulated double pulsing, an inverter line-to-line voltage generated by PWM modulator firing signals and a resulting uncompensated line-to-line motor voltage of greater than twice voltage magnitude.
Figure 3:
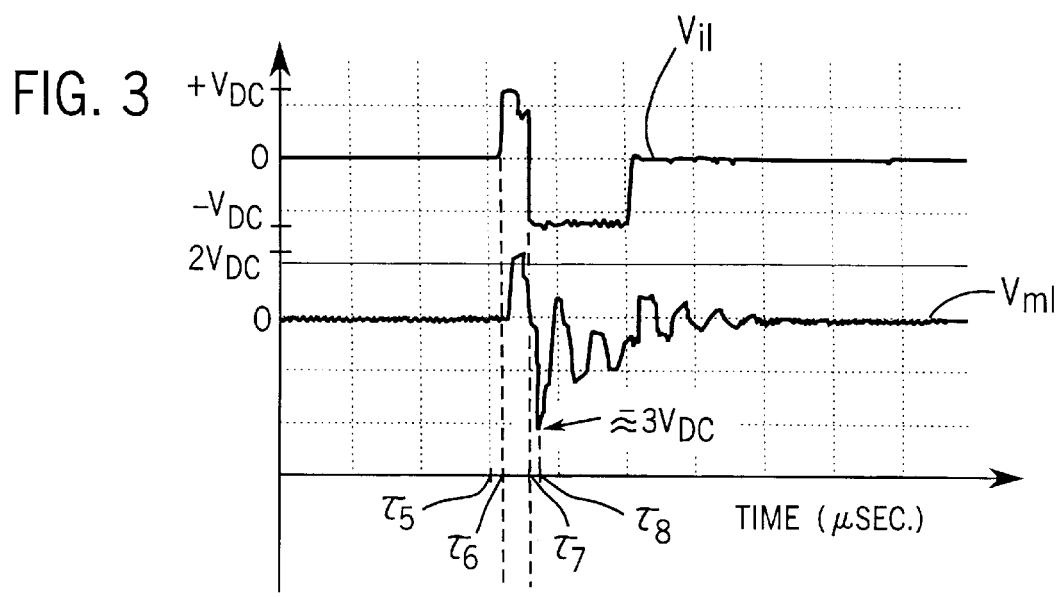
FIG. 3 is a graph illustrating greater than twice over voltage due to inverter modulated polarity reversal, including an inverter line-to-line voltage generated by PWM modulator firing signals and a resulting uncompensated line-to-line motor voltage of greater than twice voltage magnitude.

In the description which follows, like reference characters, numbers and symbols will be used to represent identical or similar elements throughout the several views. In addition, while the invention is described below in the context of a three phase motor control system, because each of the three phases operates in essentially the same manner, unless there is some important synergy between the hardware or operation of two phases, only one of the three phases and signals related thereto will be explained in detail.

A. Hardware

The present invention will be described in the context of the exemplary PWM inverter 9 shown in FIG. 4. Inverter 9 is shown connected to a PWM controller 20, a DC voltage source 18, a reflected wave eliminator 6 according to the present invention, a set of transmission lines or cables 43, 44 and 45 (collectively referred to by the numeral 7) and a motor 19.

Source 18 provides a high voltage rail 48 and a low voltage rail 49. For the purposes of this explanation source 18 may be represented by a series combination including a positive DC source 22 and a negative DC source 21 separated by a reference node 0. A capacitor 89 is provided across source 18 to essentially filter the DC voltage to obtain a ripple free DC voltage between rails 48 and 49. Typical values of capacitor 89 range between 1,000 uf and 20,000 uf dependent on drive horsepower rating.

Motor 19 includes three stator windings 35, 36 and 37 connected in a Y-configuration as well known in the art, each winding 35, 36 and 37 linked to a separate transmission line 44, 43, 45, respectively at unique motor terminals 30, 31, 32, respectively. Distal ends of lines 43, 44 and 45 are linked to intermediate nodes 95, 96 and 97, respectively. Each line 43, 44 and 45 is characterized by a line inductance L and a line capacitance C exists between each pair of transmission lines 43–44, 43–45 and 44–45 (see also FIG. 1 in this regard).

Inverter 9 consists of six solid state switches 12–17 (BJT, GTO, IGBT or other transistor technology devices may be used) arranged in series pairs 12–13, 14–15 and 16–17 between positive and negative DC rails 48, 49, repsectively. Each switch 12–17 is coupled with an inverse parallel connected diode 23–29, repsectively.

Each pair of switches 12–13, 14–15, and 16–17, makes up a separate leg 39, 40 or 41 of inverter 9 and has a common node 91, 92 or 93, respectively, which is electrically linked to one of terminals 31, 30 and 32 (and thus to a unique stator winding 35, 36 or 37), repsectively, after passing through respective phases of eliminator 6 and transmission lines 43, 44 or 45. For example, node 91 is linked through a first phase of eliminator 6 to intermediate node 95 which is in turn directly linked via transmission line 43 to terminal 31.

Each switch 12–17 is also electrically connected by a firing line 51–56 to controller 20. Controller 20 provides turn on and turn off signals to each of switches 12–17 to turn the switches on and off thereby alternately connecting motor terminals 30, 31 and 32 to positive and negative DC rails 48, 49, respectively.

Eliminator 6 is linked in series between inverter nodes 91, 92 and 93 and intermediate nodes 95, 96 and 97 (i.e. between inverter 9 and transmission lines 43, 44 and 45). Eliminator 6 consists of a common mode choke (CMC), three relatively short sections of transmission line 29, 34 and 38, and a filter network 8. Filter 8 includes three inductors 102, 104 and 106 and three resistors 101, 103 and 105. As well known in the controls art, while inverter output currents through nodes 91, 92 and 93 should all vary with time and all three currents will never be identical at the same time, the combined values of the inverter output currents should equal zero amps. When the combined currents do not add to a zero value, a common mode current is said to exist which adversely affects motor control. CMC 107 is provided to eliminate common mode currents.

To this end, as well known in the art, CMC 107 includes a flux guiding core (not illustrated) around which transmission lines 29, 34 and 38 are wrapped so that common mode currents through the lines (i.e. currents which do not add to a zero value) are effectively canceled. Each line 29, 34 and 38 is linked to an inverter output node 91, 92, or 93, respectively, is wrapped around the core in the same direction an identical number of times and is terminated at an intermediate node 83, 85, 86, respectively. In operation, current through the lines induces a flux in the core. Because intended currents generated by inverter 9 add to a zero value, only common mode currents induce flux in the core. The flux provides a high impedance to common mode currents and thereby effectively eliminates the common mode currents.

Inductors 102, 104 and 106 are chosen so as to have essentially identical electrical operating characteristics. Similarly, resistors 101, 103 and 105 are chosen to have essentially identical electrical operating characteristics. Inductor 102 is linked between intermediate nodes 83 and 95, inductor 104 is linked between nodes 85 and 96 and inductor 106 is linked between intermediate nodes 86 and 97. Resistors 101, 103 and 105 are linked in parallel with inductors 102, 104 and 106. Preferably, eliminator 6 is mounted in close physical proximity to inverter 9 (i.e. transmission lines 29, 34 and 38 are relatively short compared to lines 43, 44 and 45).

Inductors 102, 104 and 106 and resistors 101, 103 and 105 are specifically chosen based on transmission line theory to eliminate undesirable voltage waves on lines 43, 44 and 45. The factors considered when choosing inductor and resistor values and how to chose the values correctly are explained in more detail below.

B. Operation

Initially, operation of inverter 9 to generate voltage waveforms at inverter output nodes 91, 92 and 93 is explained and then operation of eliminator 107 to eliminate reflected and standing waves is explained.

1. Inverter Operation

To simplify this explanation, unless there is some synergy between legs 39, 40 and 41 only operation of leg 39 will be explained here in detail. With respect to operation of leg 39, referring again to FIG. 4, controller 20 operates to turn switches 12 and 13 on and off in a repetitive sequence that alternately connects the high and low voltage rails 48, 49 to, and produces a series of high frequency voltage pulses at, terminal 31.

Figure 5A:
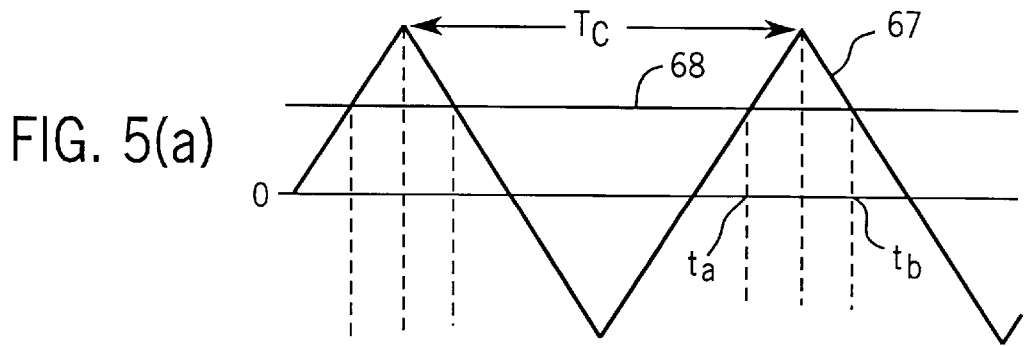
FIG. 5(a) is a graph illustrating exemplary signals used by a PWM inverter to produce high frequency voltage pulses.

Referring also to FIG. 5a, signals 67 and 68 used by controller 20 to generate firing pulses to turn switches 12 and 13 on and off are illustrated. A carrier signal 67 is perfectly periodic and operates at what is known as a carrier frequency fc. Carrier frequencies fc used in PWM drives typically range between I KHz to 10 KHz. A modulating signal 68 has a much greater period than the carrier frequency 67. A modulating signal frequency fm corresponds to the desired fundamental output frequency of waveforms to be generated by inverter 9.

Figure 5B:
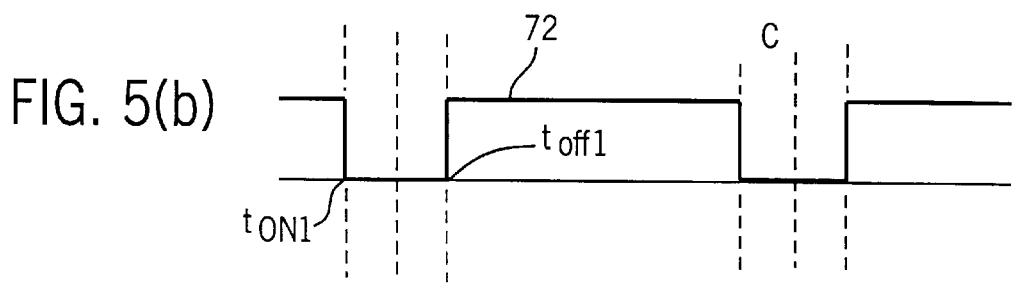
FIGS. 5(b) and 5(c) are graphs illustrating PWM firing signals generated by comparison of the signals of FIG. 5(a) and FIG. 5(d) is a graph illustrating a high frequency pulse generated by the firing pulses of FIGS. 5(b) and 5(c)
Figure 5C:
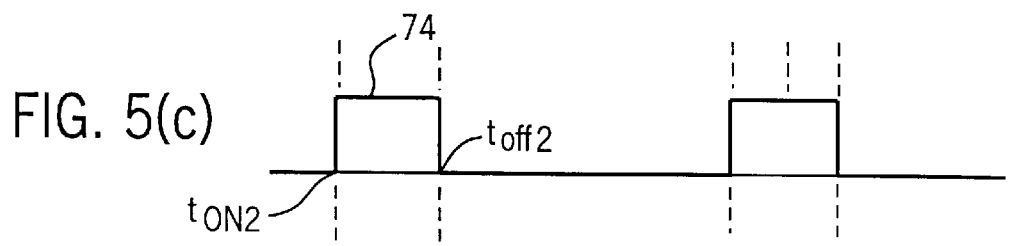

Referring also to FIGS. 5b and 5c an upper signal 72 and a lower signal 74 which are formed by comparing signals 67 and 68 and which are used to control upper and lower switches 12, 13, respectively, can be observed. The turn-on $t_{on1}$, $t_{on2}$ and turn-off $t_{off1}$, $t_{off2}$ times of the upper and lower signals 72, 74 come from the intersections of modulating signal 68 and carrier signal 67. When signal 68 intersects carrier signal 67 and signal 67 has a positive slope, upper signal 72 goes off and lower signal 74 goes on. On the other hand, when signal 68 intersects signal 67 while carrier signal 67 has a negative slope, upper signal 72 goes on and lower signal 74 goes off.

Figure 4:
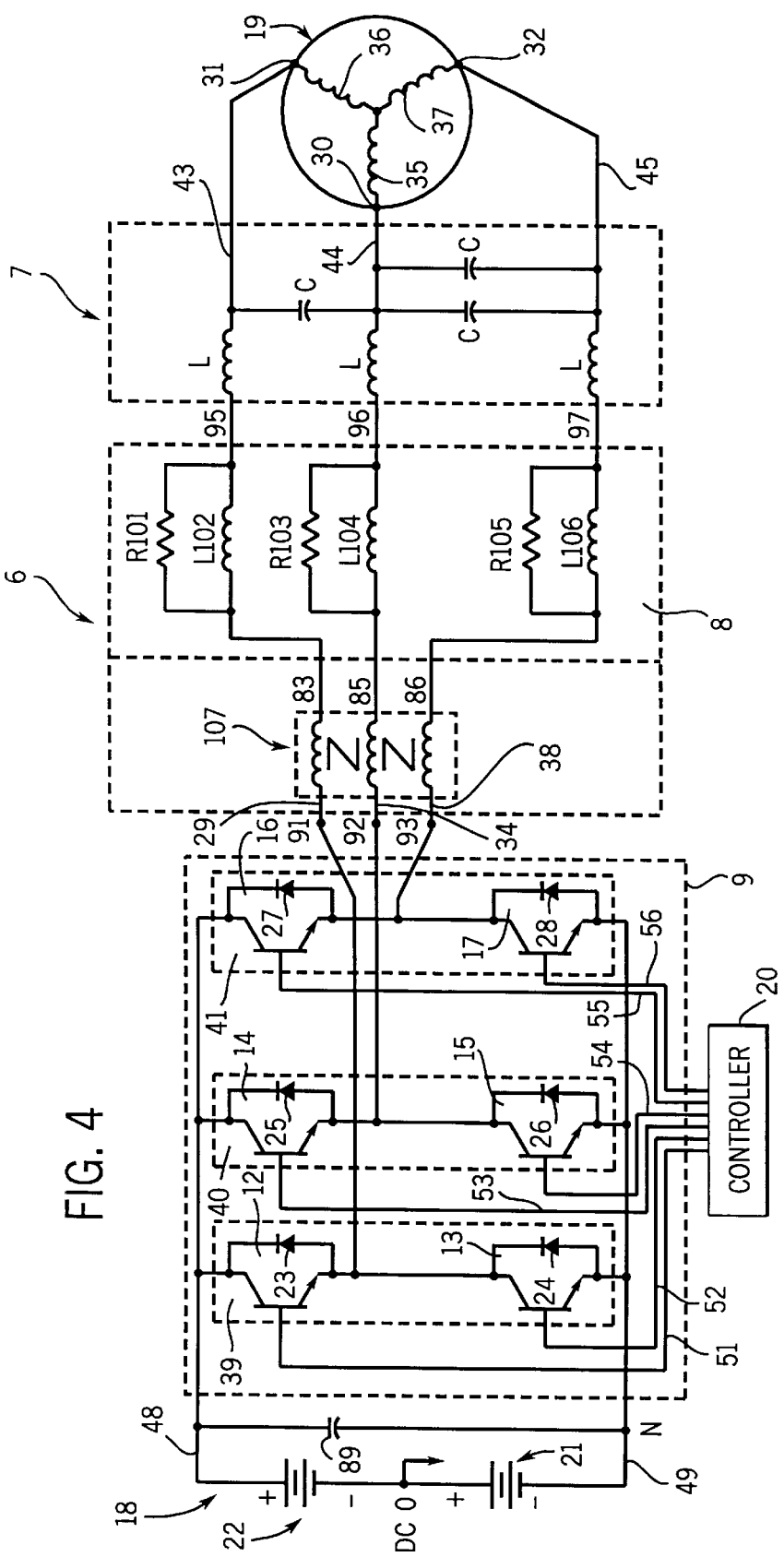
FIG. 4 is a schematic diagram of the inventive apparatus linked to supply lines between an inverter and a motor.
Figure 5D:
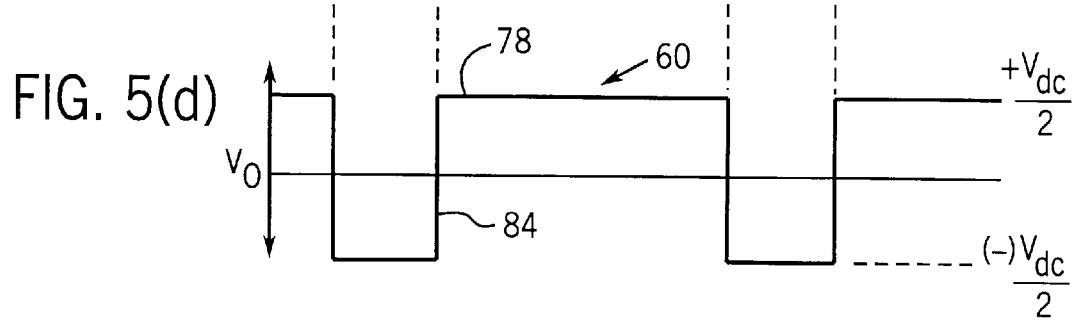

Referring to FIGS. 4 and 5d, a high frequency voltage pulse 60 resulting from the upper and lower signals 72, 74 in FIGS. 5b and 5c that might be provided at terminal 31 is illustrated. When upper signal 72 is on and lower signal 74 is off, switch 12 allows current to flow from positive rail 48 to terminal 31 thus producing a positive phase 78 of pulse 60 at motor terminal 31. Ideally, when the upper signal 72 goes off and the lower signal 74 goes on, switch 12 immediately turns off and switch 13 immediately turns on connecting terminal 31 to negative rail 49 producing a negative phase 80 of pulse 60 at motor terminal 31. In reality, to eliminate a short between the positive and negative DC rails 48 and 49, a dead time or delay is introduced between the times when one switch turns off and an associated switch turns on. High frequency pulses 60 average over a given period to produce a low frequency alternating voltage at terminal 31. Ideally, the maximum amplitudes of positive and negative phase portions 78, 84, respectively, are plus or minus $V_{DC}/2$.

Figure 6:
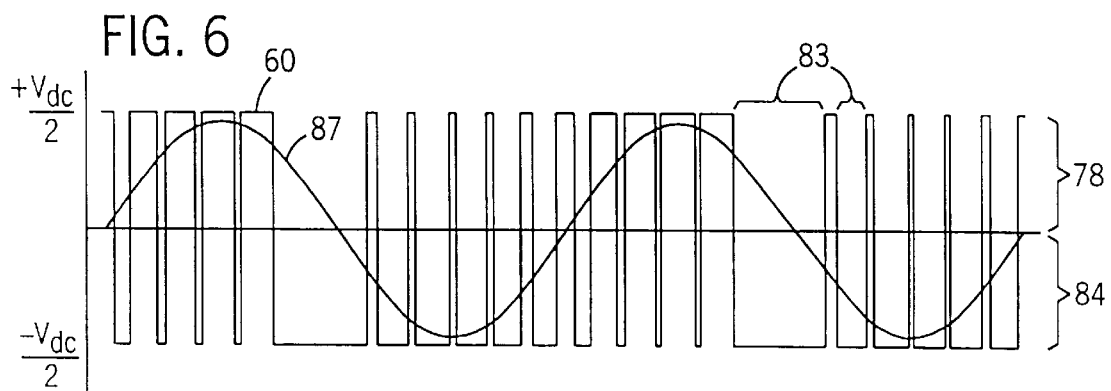
FIG. 6 is a graph illustrating single phase high frequency voltage pulses and a resulting associated fundamental low frequency alternating voltage.
Figure 7:
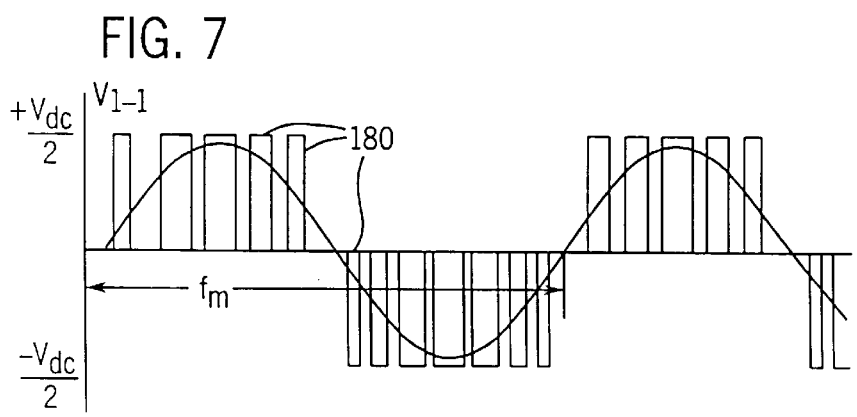
FIG. 7 is a graph illustrating line-to-line output voltage between two supply lines and a resulting fundamental low frequency alternating voltage.

Referring also to FIG. 6, an exemplary sequence of high frequency pulses 60 that might be produced by leg 39 can be observed along with a fundamental low frequency alternating voltage 87 that is produced at associated motor terminal 31. By varying the widths of the positive portions 78 of each high frequency pulse relative to the negative portions 84 over a series of pulses 60, an average value of pulse voltages which alternates sinusoidally can be generated. The average values define fundamental low frequency alternating voltage 87. Both the amplitude and frequency of voltage 87 can be controlled by modifying the widths of pulses 60 and thus, the speed of motor 19 can be controlled.

Figure 8:
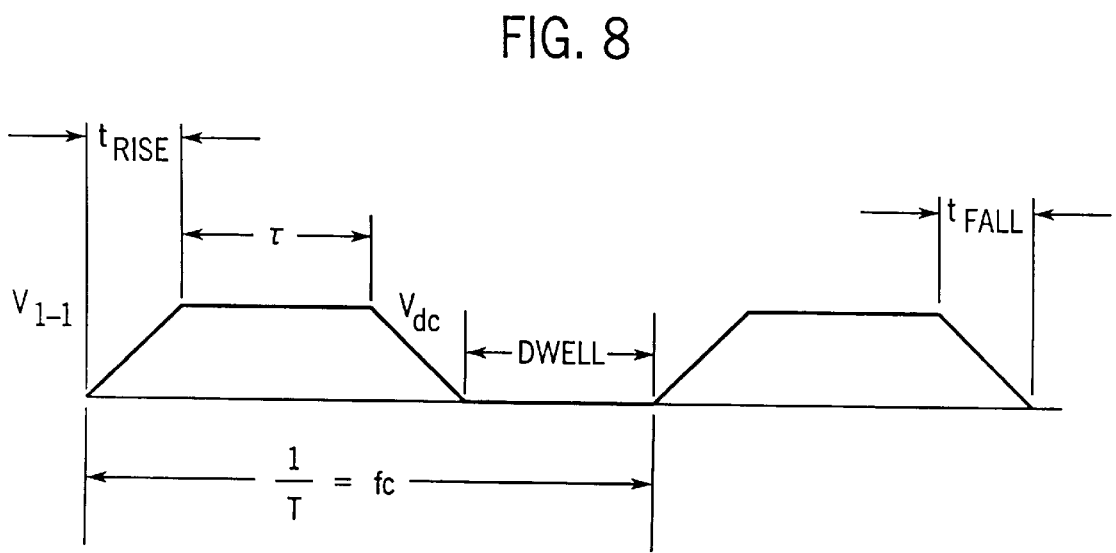
FIG. 8 is a graph with a detail expansion of the pulse train of FIG. 7 showing pulse rise and fall times.

Inverter 9 generates low frequency alternating voltages like voltage 87 at each of output nodes 91, 92 and 93, the voltages across line pairs being line-to-line voltages. Referring also to FIG. 8, exemplary line-to-line high frequency voltage pulses 180 and a resulting lint-to-line low fundamental frequency voltage 182 are illustrated. The maximum value of voltage 182 is the DC bus voltage $\pm V_{dc}$ which occurs when one line is linked to positive DC rail 48 and the other is linked to negative DC rail 49.

Figure 9:
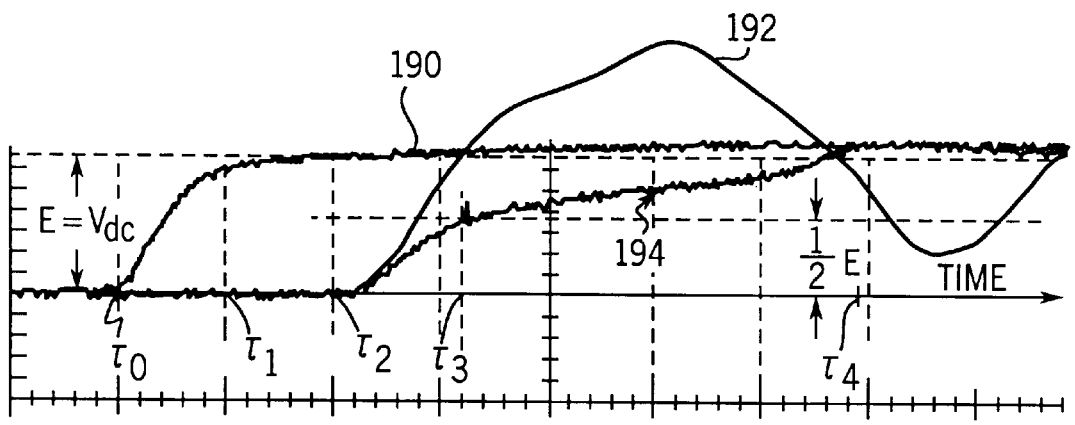
FIG. 9 is a graph illustrating an inverter generated pulse, a resulting pulse at a motor terminal without the eliminator and a resulting terminal pulse with the eliminator.

Referring to FIG. 9, two high frequency line-to-line voltage pulses 180 of FIG. 8 have been expanded to show that each pulse effectively has three different sections including a rise time trise, an on time τ and a fall time fall, the duration of each rise and fall time being related to the type of semiconductor switching devices used to configure inverter 9. A switch rise time frequency fu is defined as in Equation 5 above and is used to identify proper inductor values as described in more detail below.

While controller 20 allows a user to choose different motor speeds and other motor operating parameters and thus allows any given motor to be used in many different ways, high frequency line-to-line pulses 180 cannot be fully absorbed by the stator windings and thus produce reflected voltages which result in standing waves and voltage surges along supply lines.

2. Eliminator Operation

Referring again to FIG. 4, when a voltage pulse is generated by inverter 9 between two transmission lines (e.g. 29–34), the pulse propagates toward motor 19, some of the voltage being absorbed within the motor stator windings 35, 36 and 37 and some of the voltage being reflected back toward inverter 9. The combined generated and reflected voltages can cause greater than twice overvoltage. In addition, certain triggering sequences of switches 12 though 17 can cause greater than twice overvoltage.

The inventive eliminator effectively eliminates or substantially reduces transmission line voltages which are greater than an intended line voltage equal to the DC bus voltage Vdc. To this end, referring to FIG. 4 and specifically to eliminator components between inverter output nodes 91 and 92 and motor terminals 31 and 30, assuming a forward traveling pulse is generated at node 91 traveling toward terminal 31 which continues through windings 36 and 35 and then through parallel inductor 104 and resistor 103 to node 92, inductors 102 and 104 initially provide a large impedance to the pulse thereby forcing the pulse through resistors 101 and 103. During this time, resistors 101 and 103 operates to reduce the peak value of the pulse across terminals 31 and 30. Eventually inductor 102 and 104 impedances decrease until inductors 102 and 104 effectively become short circuits. When inductors 102 and 104 become short circuits, resistors 101 and 103 effectively become open circuits and the pulse across terminals 31 and 30 rises to a peak value equal to the DC bus voltage Vdc.

Reflected pulses from terminals 31 and 30 due to imperfect impedance matching between cable 43 and motor 19 travel from terminal 31 toward resistor 101 and inductor 102, through inverter 9, through inverter output node 92 and through inductor 104 and resistor 103. When the backward traveling pulse reaches resistors 101 and 103 and inductors 102 and 104, again, inductors 102 and 104 operate as a high impedances and the backward traveling pulse is forced through resistors 101 and 103. Resistors 101 and 103 dissipate the reflected pulse.

Hereinafter, first, operation of the inventive eliminator to slow the rise time of a forward traveling voltage pulse on a line and operation of the eliminator to minimize reflected wave magnitude is described. Second methodology for selecting resistor and inductor values is described.

a. Limiting Peak Line Voltage

Referring to FIG. 4 and also to FIG. 9 where three waveforms are illustrated, an exemplary inverter output line-to-line voltage pulse between lines 91 and 92 is referenced by numeral 190, an associated exemplary line-to-line terminal voltage pulse provided to motor terminals 31 and 30 which results when the inventive eliminator is not employed is referenced by numeral 192 and an associated exemplary line-to-line terminal voltage pulse provided to motor terminals 31 and 30 which results when the inventive eliminator is employed is referenced by numeral 194.

For the purposes of this explanation, it will be assumed that during an initial switching state prior to time τ0, switches 12 and 17 are closed linking nodes 91 and 93 to positive rail 48, while switch 14 is open linking node 92 to the negative rail 49. The inverter line-to-line output voltage between lines 91 and 92 during this first state is calculated using Kirkoff's voltage law (see next Eq.) referenced to neutral point node-0 located at the midpoint of source 18.

$$Vll=(Vdc/2)-(Vdc/2)=0 \quad\quad\quad \text{Eq. 10}$$

Thus, line-to-line output voltage Vll between nodes 91 and 92 has a zero voltage prior to time τ0. During a next switching state beginning at time τ0, controller 20 controls switches 12–17 such that switches 12 and 17 remain closed linking nodes 91 and 93 to positive and negative DC rails 48, 49, respectively. However, switch 14 is opened and associated switch 15 is closed thereby disconnecting node 92 from rail 48 and connecting node 92 to negative rail 49. A small dead time between opening switch 14 and closing switch 15 is provided to eliminate the possibility of a short between rails 48 and 49.

As illustrated, due to semiconductor physics which makes immediate turn on (and off for that matter) of switches impossible, switch 15 turns on between times To and 11 during which inverter output line-to-line voltage waveform rises from zero to value E equal to the DC bus voltage Vdc (i.e. the value of source 18). A line-to-line forward traveling voltage pulse 190 is generated between nodes 91 and 92. Line-to-line voltage Vll between nodes 91 and 92 during this second state is calculated using Kirkoff's voltage law referenced to node-0 as defined in the following equation:

$$Vll=(Vdc/2)-(-Vdc/2)=Vdc \quad\quad\quad \text{Eq. 11}$$

Thus, the line-to-line output voltage Vll 190 between nodes 91 and 92 has a rise time trise. Rise time trise is defined to be the time it takes to go from 10 to 90% of a steady state pulse magnitude.

Referring still to FIGS. 4 and 9, after pulse 190 is generated, between times τ1 and τ2, pulse 190 travels toward terminals 31 and 30. After time τ2 pulse 190 begins to increase the voltage level across terminals 30 and 31. Ideally, between times τ2 and τ3 pulse 190 increases to equal magnitude E and does not overshoot magnitude E where the period between times τ2 and τ3 is equal to the period between times τ0 and τ1. In reality, however, as can be seen in FIG. 9, without use of the inventive eliminator, pulse 192 substantially overshoots magnitude E and then oscillates excessively prior to reaching a steady state level E.

However, referring to pulse 194, when inventive eliminator 6 is employed, while it takes a relatively longer period (i.e. between times τ2 and τ4) for voltage 194 to achieve magnitude E, there is essentially no overshoot.

In order to understand how eliminator 6 operates it is advantageous to provide an equivalent circuit for two transmission lines and derive equations therefrom for studying the effects of eliminator 6.

Figure 10:
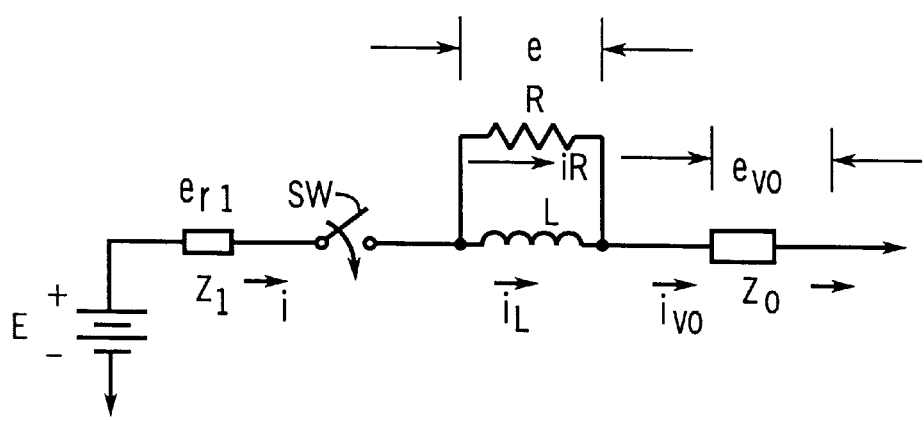
FIG. 10 is an equivalent circuit schematic representation of a portion of FIG. 4.

Referring to FIGS. 4 and 10, for the purposes of this explanation, a single switch Sw, in this example assumed to be switch 12, of inverter 9 and associated components can be represented by an equivalent circuit consisting of a DC source having a voltage magnitude E and some small stray impedance $Z_1$. Inductors 102 and 104 and resistors 101 and 103 can be reduced to a lump sum parallel system including inductor L and resistor R (see FIG. 10). Cable set 7 surge impedance is represented by impedance Zo described earlier. Since motor surge impedance $Z_t$ is much greater than cable surge impedance Zo, the motor is represented by an open circuit. With the circuit of FIG. 10, an equation can be developed to describe a line-to-line forward traveling waveform or pulse $e_{vo}$ (see 190 in FIG. 10) entering a motor stator winding at the end of cable set 7.

Referring still to FIG. 10, when switch Sw is closed a reverse traveling wave er1 from switch Sw back toward source E results due to the switch discontinuity. In addition, a transient voltage e across parallel inductor L and resistor R as well as forward traveling wave evo into cable impedance Zo result. Current through $Z_1$ is i, through resistor R is iR, through inductor L is iL and through impedance Zo is $i_{vo}$. Using FIG. 10, the following equation can be written:

$$E + e_{r1} = e + e_{vo} \qquad \text{Eg. 12}$$

When switch Sw is closed circuit currents can be related by the following equation:

$$i_{vo} = i = iR + iL \qquad \text{Eq. 13}$$

Using Ohm's law the relationships in the immediately preceding Equation can be rewritten as:

$$i = \frac{e_{vo}}{Z_0} = \frac{-e_{r1}}{Z_1} \qquad \text{Eq. 14}$$

The immediately preceding equation can be rewritten as:

$$e_{r1} = -\frac{Z_1}{Z_0} e_{vo} \qquad \text{Eq. 15}$$

Combining Equations 12 and 15 and solving for voltage $e_{vo}$ entering terminals 30 and 31:

$$e_{vo} = (E - e)\left(\frac{Z_0}{Z_1 + Z_0}\right) \qquad \text{Eq. 16}$$

Referring again to FIG. 10, Kirkoff's voltage law for the equivalent circuit yields the following set of equations:

$$E - e = \left[\frac{e}{R} + \frac{1}{L}\int e\,dt\right](Z_1 + Z_0) \qquad \text{Eq. 17}$$

$$E = e\left(1 + \frac{Z_1 + Z_0}{R}\right) + \left[\frac{(Z_1 + Z_0)}{L}\int e\,dt\right]$$

$$E = e\left(\frac{R + Z_1 + Z_0}{R}\right) + \left[\frac{(Z_1 + Z_0)}{L}\int e\,dt\right]$$

A time solution for the transient voltage across resistor R and inductor L is readily done by converting the last equation in Equation 17 to the Laplace s domain as follows:

$$\frac{E}{s} = A e(s) + B\frac{e(s)}{s} \qquad \text{Eq. 18}$$

$$\text{where } A = \left(\frac{R + Z_1 + Z_0}{R}\right) \text{ and } B = \left[\frac{(Z_1 + Z_0)}{L}\right]$$

$$e(s) = \frac{E}{(sA + B)} = \frac{E}{A}\left[\frac{1}{\left(s + \frac{B}{A}\right)}\right]$$

$$e(t) = \frac{E}{A} e^{-\frac{B}{A}t} = \frac{E}{A} e^{-\frac{t}{\tau}}$$

$$e(t) = E\left(\frac{R}{R + Z_1 + Z_0}\right) e^{-\frac{t}{\tau}}$$

$$\text{where } \tau = \left(\frac{R + Z_1 + Z_0}{R}\right)\left(\frac{L}{Z_1 + Z_0}\right)$$

$$e_{vo} = (E - e)\left(\frac{Z_0}{Z_1 + Z_0}\right)$$

$$e_{vo} = \left[E - E\left(\frac{R}{R + Z_1 + Z_0}\right)e^{-\frac{t}{\tau}}\right]\left[\left(\frac{Z_0}{Z_1 + Z_0}\right)\right]$$

Combining Equation 16 and the last Equation in Equation 18 an equation for a forward traveling wave entering the motor stator can be expressed as:

$$E_{vo} = E\left(\frac{Z_0}{Z_1 + Z_0}\right)\left[1 - \left(\frac{R}{R + Z_1 + Z_0}\right)e^{-\frac{t}{\tau}}\right] \qquad \text{Eq. 19}$$

$$\text{where } \tau = \left(\frac{R + Z_1 + Z_0}{R}\right)\left(\frac{L}{Z_1 + Z_0}\right)$$

In reality, stray impedance $Z_1$ in Equation 19 is practically zero. In addition, it will be shown below that it is desirable to make R=Zo in Equation 19. Making these substitutions, Equation 19 simplifies to:

$$e_{vo} = E\left[1 - \left(\frac{1}{2}\right)e^{-\frac{t}{\tau}}\right] \text{ where } \tau = \left(\frac{2}{1}\right)\left(\frac{L}{Z_0}\right) \qquad \text{Eq. 20}$$

Referring again to FIG. 9, the traveling wave defined by Eq. 20 has a propagation time τ2–τ1 between inverter 9 and motor 19. For the purposes of this explanation, at time τ2, t=o may be substituted into Equation 20. Where resistor R is equal to impedance Zo, resulting voltage $e_{vo}$ represented by pulse 194 in FIG. 9 steps to a magnitude E/2 within risetime trise as defined by switch Sw. Also, referring to Equation 20, it should be observed that the final peak transient value of voltage $e_{vo}$ entering the motor terminals at time $\tau_4$ (e.g., t=5$\tau$ in Eq. 20)) in FIG. 9 is only the DC source voltage value E. Also, from Equation 20 it can be seen that when R=Zo, the time (i.e. between times $\tau$3 and $\tau$4) for voltage pulse 194 to rise from magnitude E/2 to magnitude E is governed by time constant $\tau$ which can be selected by selecting inductor L as a function of the fixed cable surge impedance Zo.

Referring to FIGS. 4 and 9, assuming a forward traveling voltage pulse defined by Equation 20 between lines 91 and 92 and also assuming a motor reflection coefficient Km which is approximately 1.0, when the forward traveling voltage pulse enters the surge impedance discontinuity between cable impedance Zo and motor surge impedance $Z_t$ at terminals 31 and 30 at time $\tau$2, a backward traveling pulse of the same polarity is immediately generated between terminals 31 and 30. The backward traveling pulse travels through cable 7 components toward inverter 9. Upon entering eliminator 6 inductors 102 and 104 provide a high impedance to the steep front end of the backward traveling pulse. The backward traveling pulse therefore goes through resistors 101 and 103. The resulting current through node 83 enters inverter output node 91, passes through diode 23 to rail 48, down through bus capacitor 89 to rail 49, through diode 26 back to node 92 and returns to node 96 to complete the circuit. Capacitor 89 has a large value and therefore is essentially a short circuit to the backward traveling pulse. Thus, resistors 101 and 103 operate to terminate all backward traveling pulses.

Referring still to FIG. 4, Equation 4 can be rewritten as:

$$KI = \frac{R1 + R2 - Z_0}{R1 + R2 + Z_0} \qquad \text{Eq. 21}$$

where KI is the reflection coefficient of the rearward traveling wave and R1 and R2 are the resistances of resistors 101 and 103, respectively and where R1+R2 is resistance R in FIG. 10. When the sum of resistors 101 and 103 are selected to specifically match cable 7 surge impedance Zo, then according to Equation 21, coefficient Kl is zero and all further reflections are eliminated. In this case, the backward traveling pulse is prevented from traveling back to the motor where further oscillations and peak transient voltages can develop.

b. Selecting R and L Values

There are three important objectives which are met when suitable resistor and inductor values are chosen for the inventive eliminator. These objectives are:

Objective (1) Limit peak pulse voltage amplitude at motor terminals to DC bus voltage Vdc for very long cable lengths;

Objective (2) Minimize high frequency pulse distortion; and

Objective (3) Maintain high fundamental voltage at frequency fm.

An example of how to select resistor and inductor values to achieve these objectives is helpful. To this end, consider a 5 hp ASD with a cable surge impedance Zo of 66 Ohms. In this case, each phase resistor 101, 103 and 105 should be chosen to have essentially a specific resistive value equal to 33 ohms (i.e. approximately $Z_0/2$). This value will make the forward traveling line-to-line pulse into motor 19 step up to value (Vdc/2) in the rise time trise of one of the switches 12 through 17. This specific selection of resistors 101, 103 and 105 also guarantees that a backward traveling wave from motor 19 back to the inverter 9 will be fully attenuated to zero and thus eliminates any further increase in peak voltage at motor terminals 30, 31 and 32 above the ideal Vdc value or oscillations which are essentially around the ideal value. After selecting resistors 101, 103, 105, inductors 102, 104 and 106 can be selected to adjust the time required for the pulse value to rise from (Vdc/2) to Vdc (i.e. time constant $\tau$ can be adjusted in Equation 13 by selecting inductor values).

Referring now to FIG. 11a, therein is illustrated a phase angle of an R-L impedance combination vs. frequency for a parallel resistor-inductor set (e.g. in FIG. 4, resistor 101 and inductor 102) with the resistor value fixed at 33 ohms per the 5 hp example above and various inductor values. Plot 200a is for L=50 uh. Plot 201a is for L=100 uh. Plot 202a is for L=200 uh. Plot 203a is for L=300 uh.

FIG. 11b shows impedance magnitude of an R-L impedance combination vs. frequency with the resistor value fixed at the 33 ohms per the 5 hp example above and various inductor values. Plot 200b is for L=50 uh. Plot 201b is for L=100 uh. Plot 202b is for L=200 uh. Plot 203b is for L=300 uh.

On each of FIGS. 11a and 11b three frequency ranges are illustrated including an exemplary low modulating wave frequency fm of between 2 and 60 Hz which is also the line-to-line frequency of the low frequency alternating voltage output by inverter 9, a carrier frequency range of between approximately 1 and 10 KHz and a high switch risetime frequency (i.e. fu=1/$\pi t_{rise}$). Because present day inverters are typically constructed using IGBTs, rise times trise are very short. The following table illustrates typical rise times trise and associated frequencies fu. Thus, an exemplary fu range might be between 700 Khz and 10 Mhz.

| semiconductor risetime [ns] | Fourier equivalent frequency fu [hz] |
| --- | --- |
| 50 | 6.36 MHz |
| 100 | 3.18 MHz |
| 200 | 1.59 MHz |
| 400 | 795 kHz |

With respect to fundamental frequency range fm, referring still to FIG. 11a, the phase angle for any R-L impedance combination in a fundamental frequency fm range between 2 Hz and 60 Hz is virtually 90 degrees. Thus all the high current and inverter output power within the range 2 to 60 Hz flows through the inductor and not the resistor, which minimizes resistor watts loss. Referring also to FIG. 11b, for any R-L impedance combination in a fundamental frequency fm range between 2 Hz and 60 Hz the impedance is virtually zero, thus meeting the objective of minimizing the drop in voltage at fundamental frequency fm.

With respect to switch frequency range fu, referring to FIG. 11b, all R-L impedance combinations exhibit the required specific impedance of 33 ohms in the fu frequency range for typical IGBT rise times trise. The required impedance must be 33 ohms but must look like a resistor of 33 ohms at any frequency within the fu range. Thus, a phase angle of zero degrees at any fu frequency is required. Referring again to FIG. 11a, plot 200a with L=50 uh and R=33 ohms is not acceptable at the low fu range, since it has a 10 degree phase angle at the low fu range. Plot 200b with L=100 uh and R=33 $\Omega$ is marginal. Thus, the higher the inductance value (e.g. 200 and 300 $\mu$h), the more the parallel R-L combination looks like a pure termination resistor in the fu range. Thus resistor and inductor values of R=33 $\Omega$, L=200 uh or R=33 $\Omega$, L=300 uh would meet objective (1) limiting the peak pulse voltage to DC bus voltage Vdc at the motor terminals for very long cable lengths.

With respect to carrier frequency range fc, it is desirable if the R-L impedance combination operates as a pure inductor with a 90° phase angle and zero impedance at carrier frequencies fc so as to facilitate complete current flow through the inductor, keep watts loss in the resistor to a minimum and so as to minimize ripple current. Clearly, higher inductance results in decreased phase angles in the fc range, forcing more fc ripple current through the parallel resistor. Plot 200a has, approximately an 85° phase angle and 3 ohm impedance, which is desirable. However, to meet the reflected wave elimination constraint in the fu range, the lowest acceptable inductor value is in the 100 to 200 uh range.

Referring now to FIG. 11c, FIG. 11c is similar to FIG. 11a, albeit having an inductor value fixed at 200 uh and having varying resistor values. Plot 300 is for R=1,000 Ω. Plot 301 is for R=500 Ω. Plot 302 is for R=100 Ω and Plot 303 is for R=33 Ω. It is seen that only plot 303 meets the requirement in the fu frequency range for a pure resistor having a 0° phase angle so that reflected wave peak voltage is eliminated.

Thus, in the example above, according to the design objectives and the present methodology, values for inductors 102, 104 and 106 would be in the 100–200 uh range and values for resistors 101, 103 and 105 would be 33 ohms.

In summary, first terminal line impedance $Z_0$ should be measured. Then, resistor values 101, 103 and 104 should be selected so that each is approximately ½ the impedance $Z_0$. Next, plots similar to those in FIGS. 11a and 11b should be generated with the chosen resistor value and different inductor values. The final inductor value should yield approximately a 90° phase angle at modulating wave frequencies fm, an essentially zero degree phase angle in the high frequency switch range fu. Then, after suitable inductor values in light of the above rules have been identified, the suitable inductor which has the highest phase angle and lowest impedance in the carrier frequency range fc should be chosen.

C. Results

Figure 12A:
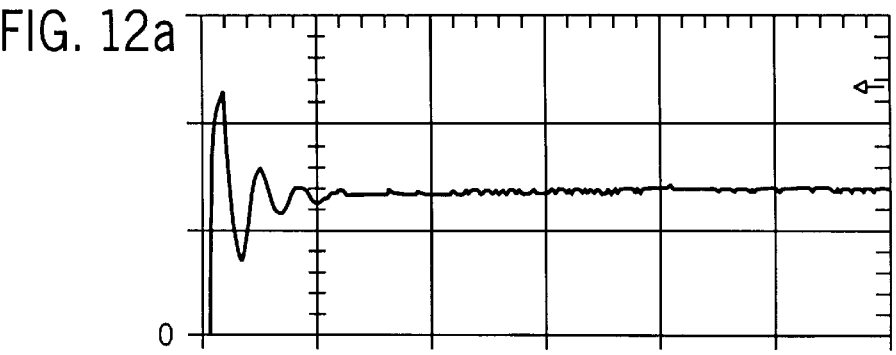
FIG. 12a is a graph illustrating the reflected wave phenomenon where the inverter is not employed.
Figure 12B:
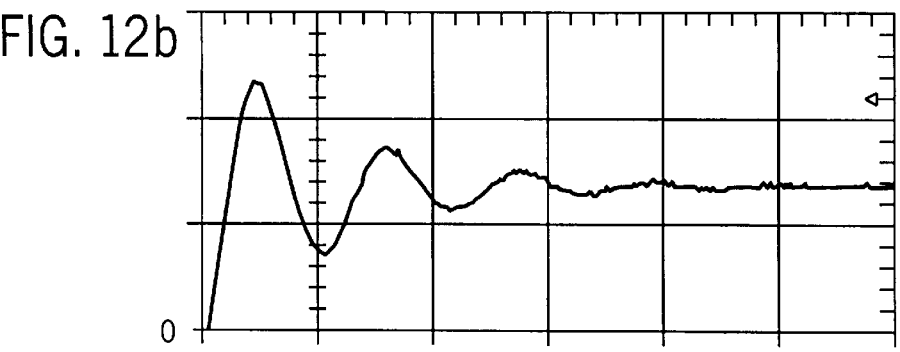
FIG. 12b is similar to FIG. 12a, albeit with an inventive apparatus having too high of a resistor valve.

Line voltages generated during tests are illustrated in FIGS. 9, 12a and 12b and can be used to see how the present invention works to eliminate excessive line voltages. Referring specifically to FIGS. 12a and 12b each test associated with these figures was run using 200 ft cable between an inverter 9 and a motor 19 wherein the motor 19 was a 5 hp motor. All plots in FIGS. 12a and 12b are 500 volts per division on the vertical axis and 10 us per division on the horizontal axis. FIG. 12a is a plot of a peak motor terminal voltage generated without employing inventive eliminator 6. FIG. 12a demonstrates that the peak motor terminal voltage between terminals 31 and 30 (see FIG. 4) is 1.85 pu (Vpk/$V_{dc}$) higher than the steady state dc bus voltage Vdc. FIG. 12b was generated while employing the inventive eliminator 6 and its components using optimum inductor values (e.g. 200 uh) but non-optimum resistor values of 300 Ω. As can be seen, the pulse front edge is sloped and there is a change in the transient oscillation frequency but the peak voltage value is still 1.85 pu peak which is unacceptably high at the motor terminals.

Referring again now to FIG. 9 waveforms generated with and without the present invention are illustrated. The waveforms of FIG. 9 include a line-to-line inverter output voltage pulse 190 across nodes 91 and 92 (see FIG. 4), terminal voltage pulse 192 generated across terminals 31 and 30 without employing the present invention and terminal voltage pulse 194 across terminals 31 and 30 when the invention is employed. Waveform 194 was generated using a 5 hp motor, inductors having values of approximately 200 uh and resistors having values of approximately 33 ohms. In FIG. 9 the horizontal axis is 200 ns/div and the vertical axis is 500 V/div.

In FIG. 9 plot 192 demonstrates peak motor terminal voltage between lines 31 and 30 after a cable propagation delay time, and is near 1.85 pu (Vpk/Vdc bus) higher than the steady state dc bus voltage value Vdc. In many cases this 1.85 pu value far exceeds the rated voltage value for cable dielectrics and therefore is unacceptable.

However, referring to plot 194, with the present invention, the reflected wave voltage is essentially completely eliminated with a peak value near the bus value Vdc. Peak motor terminal voltage between lines 31 and 30, has a peak of only 1.01 pu (Vpk/Vdc bus) higher than the steady state dc bus voltage value. It is also beneficial that the risetime to the ideal steady state pulse value is relatively longer.

d. Common Mode Current Minimization

Figure 13:
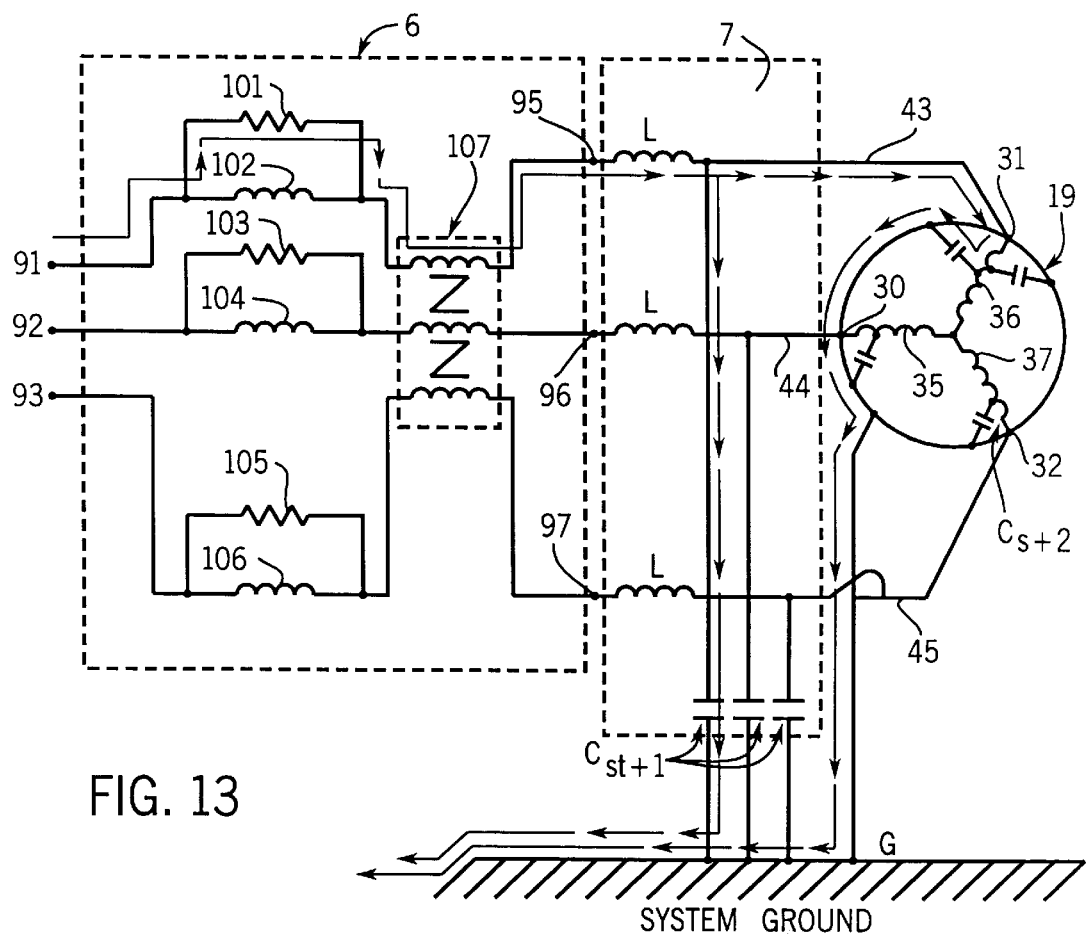
FIG. 13 is a schematic representing the common mode or line-to-ground EMI current paths in the cable and motor with the inventive filter network and a CMC.

A secondary but important additional advantage to eliminator 6 is that electromagnetic interference (EMI) line-to-ground currents from inverter 9 output nodes 91, 92 and 93 to ground. Hereinafter, these currents will be referred to as common mode transient currents Icm. Transient currents Icm are generated during the semiconductor rise and fall times trise and tfall, respectively, of the PWM pulses as illustrated in FIG. 9 when associated switches are turned on or off. Referring to FIGS. 4 and 13, the current Icm path to ground is illustrated for switching of device 12 to rail 48 as an example of one of twelve possible device switching sequences. Without the present invention, transient currents Icm flow from positive rail 48 during device 12 switching to inverter output 91 to cable 7, through cable phase inductance L, and splits into two paths. One path is through cable line to system ground stray capacitance Cst1, while the other path is through stator terminal 31 and stray motor capacitance Cst2 to the motor frame ground and then to system ground G. Transient currents Icm flow though system ground back to find the ASD 5 source transformer neutral ground connection, through the transformer windings, back to the ASD 5 AC side input, through the ASD 5 DC bus rectifier and back to rail 48 DC bus to complete the path. The peak value of current Icm is defined by the following equation:

$$I_{cm(peak)} = \frac{V_{dc}}{\sqrt{\dfrac{L}{C_{st}}}} \qquad \text{Eq. 22}$$

where L is the per phase cable 7 impedance and Cst is the sum of stray capacitances Cst1 and Cst2. Peak values of transient current Icm have been recorded as high as 20 amps peak for a 480 V utility system voltage with IGBT risetimes of 50 ns. The high Icm peak magnitude along with risetimes of 50 ns has caused sensitive electronic equipment that is referenced to system ground to malfunction in industrial control environments.

Figure 14:
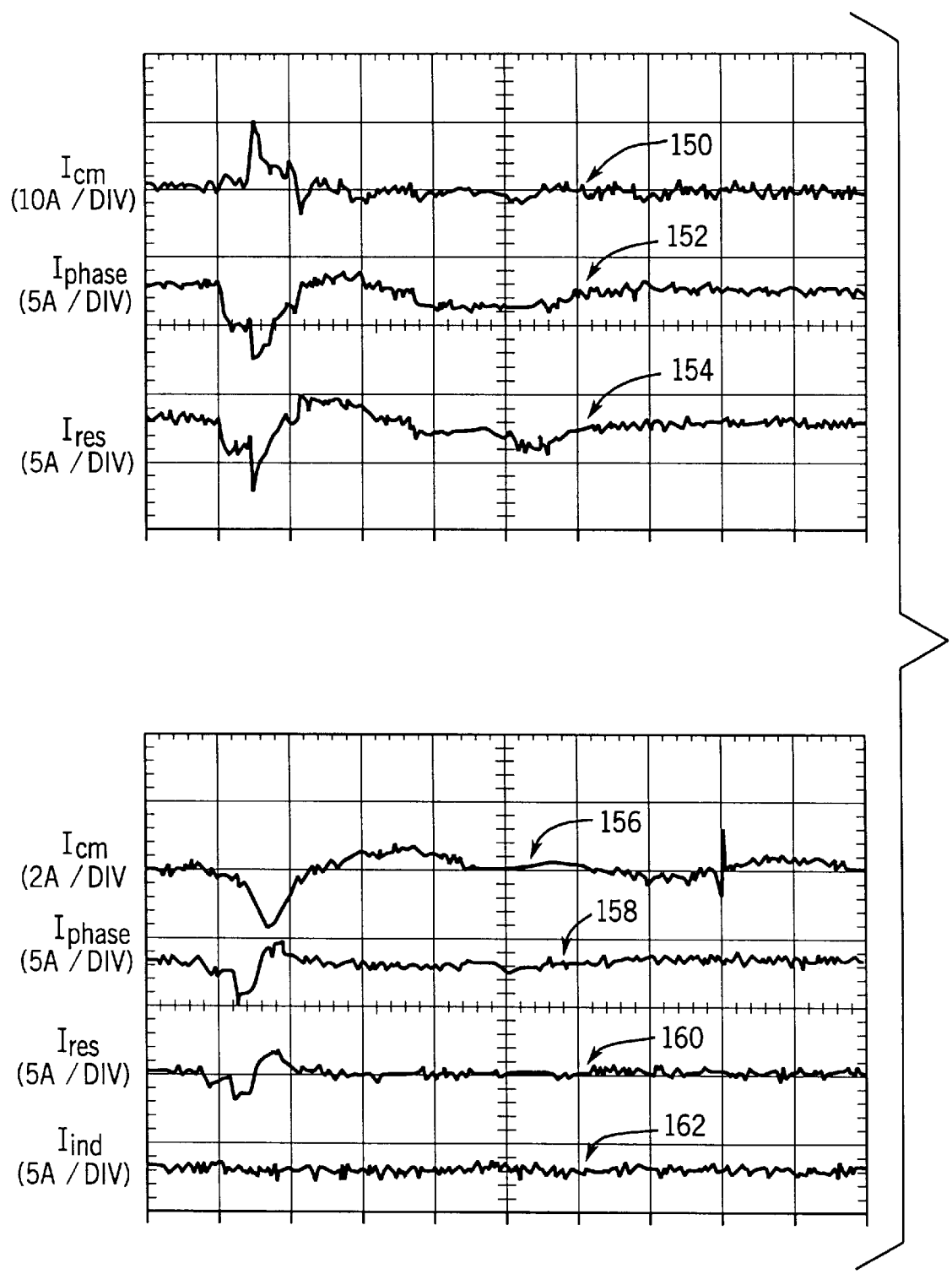
FIG. 14 includes various waveforms corresponding to eliminator currents with and without a common mode choke, the first three waveforms measured without a choke and the last four measured with a choke.

Referring now to FIG. 14, transient current Icm waveforms 150, 152 and 154 are illustrated which were generated using optimum L and R components as described above but without CMC 107. Equipment conditions for FIG. 14 were a 5 hp drive with 400 feet of cable running a motor with no external shaft load. An IGBT switch with 50 ns risetime was switched on. Plot 150 illustrates the transient current Icm waveform that goes from line-to-ground, measured by simultaneously passing lines 29, 34 and 38 through a current measuring device. Plot 152 is the phase current waveform measured by passing line 29 through a current measuring device with a vertical scale of 5 amps/div. Plot 154 is the current waveform passing through resistor 101 (see FIG. 4) measured by passing a resistor lead through a current measuring device.

It is seen in plot 152 that prior to the turn on time, there is a 3 amp load current through line 29. Following the turn on time, there is a 10 amp peak Icm current transient in plot 150 with a very steep risetime close to the device risetime. For a 650 V dc bus, the Icm peak is approximately 325 Vdc/33 ohms or 10 amps peak. Although the high peak $I_{cm}$ magnitude is reduced, the fast risetime edge of transient current Icm in plot 150 may still cause sensitive equipment in industrial environments to malfunction.

According to the present invention an inductor is added to each transmission line in the form of CMC 107 that operates only on line-to-ground transients and that works with resistors 101, 103 and 105 to further reduce transient current Icm and to reduce the slope of the resulting change in current with respect to time (di/dt).

To this end, eliminator 6 consists of the filter components 101, 102, 103, 104, 105 and 106 and CMC 107 inserted between inverter 9 and cable set 7 as illustrated in FIGS. 4 and 14. Optimum filter components 102, 104, 106, 101, 103 and 105 are designed according to the previous design methodology to virtually eliminate line-to-line reflected wave voltage on the motor. CMC 107 works in conjunction with resistors 101, 103 and 105 to reduce transient currents Icm entering the system ground reference G by providing high inductance to ground without affecting the line-to-line inductance values of 102, 104, 106 required for reflected wave voltage problems.

In addition, the CMC provides high impedance to transient currents Icm while providing virtually zero impedance at the modulating frequency fm and therefore causes only a small voltage drop to the fundamental power flow. CMC 107 may be placed on either the input side of filter 8 as in FIG. 4 or on the output side of the filter (not illustrated), since the current Icm path is a series path through CMC 107 and filter 8. CMC 107 is constructed by passing lines 29, 34 and 38 (or lines 43, 44 and 45) in the same direction through the window of a closed magnetic core or a magnetic core with a very small air gap. In this manner, current at the fundamental modulating frequency fm that flows to the motor in one line returns to the inverter through the other two lines so that phase currents ia+ib+ic currents add to zero, implying there is no magnetic field intensity in the core at fundamental frequency fm and therefore no inductance is presented to the currents and the fundamental frequency fm.

The CMC configuration 107 is optimal since it operates to eliminate only small transient line-to-ground currents without core saturation and thus can have a relatively small physical size and associated cost when compared to three separate phase line reactors (one for each phase).

Through extensive field testing at industrial sites it has been found that line-to-ground common mode currents Icm from ASDs which are less than 2 amp/µs do not cause sensitive equipment malfunction. Thus, proper CMC inductance can be selected by adjusting CMC inductance values until the change in common mode current Icm with respect to time di/dt during a transient through lines 29, 34, or 38 is lower than the threshold 2 amp/µs as tested. Typical CMC inductance is approximately 125 uh when operating with 33 ohm resistor values.

Referring again to FIG. 14, plots 156, 158, 160 and 162 were generated while employing both CMC 107 and filter 8. Plot 156 is the transient current Icm waveform from line-to-ground measured by simultaneously passing lines 29, 34 and 38 through a current measuring device with a vertical scale of 2 amps/div. Plot 156 should be compared to plot 150 above which is 10 amps/div. Clearly the CMC 107 minimizes transients current Icm.

Plot 158 is the phase current waveform measured by passing line 29 through a current measuring device with a vertical scale of 5 amps/div. Comparing plots 158 and 152, clearly, the per phase transient current is also reduced using the CMC 107.

Plot 160 is the current through resistor 101 measured by passing one of the resistor leads through a current measuring device with a vertical scale of 5 amps/div. Comparing plots 160 and 154, once again, the common mode transient is minimized by using CMC 107.

Plot 162 is the current through inductor 102 measured by passing one inductor lead through a current measuring device with a vertical scale of 5 amps/div. Referring still to plots 158 and 162 it should be appreciated that prior to closing an associated switch, there is a 3 amp load current in phase line 29. Referring also to plot 156, immediately after the switch is closed, there is only a 2 amp peak transient current Icm with a very slow risetime determined by the inductance of CMC 107 and the resistance value 101.

As seen in plots 158 and 160, the phase current and resistor current have identical waveshapes during the transient interval while inductor current in plot 162 maintains a prior load current value during the transient. Thus, the currents Icm only flow through resistor 101 and the resistor 101 reduces the currents Icm to 2 amps. The Icm noise component in plot 156 is reduced to only a 2 amp peak magnitude due to CMC 107 inductance and resistor 101, with a very desirable slow risetime of 2 amps peak at 4 us, or a di/dt rate of 0.5 Amp/us, which is below the di/dt noise threshold requirement for sensitive electronic equipment. In practice, the original Icm, without the eliminator 6, is 20 amp peak in 50 ns or a di/dt rate of 400 amp/us that is now reduced to 0.5 amp/us.

Thus, it should be appreciated that the inventive terminator 6 is a series apparatus which achieves two complimentary functions when inserted between a PWM inverter and output cable. First, the eliminator virtually eliminates destructive reflected wave line-to-line peak voltage magnitude on an ac motor due to inverter device switching interacting with cable surge impedance. Second, the eliminator functions to reduce inverter output common mode Electromagnetic Interference (EMI) line-to-ground noise current magnitude and risetime to values which are acceptable to sensitive electronic equipment.

It should be understood that the methods and apparatuses described above are only exemplary and do not limit the scope of the invention, and that various modifications could be made by those skilled in the art that would fall under the scope of the invention. For example, it may be advantageous to place filter 8 and CMC 107 in an inverter 9 enclosure or place the eliminator 6 in a separate enclosure. In addition, as indicated above, the order of CMC 107 and filter 8 is not important as the components are arranged in series. Moreover, while it is preferred that phase resistors 101, 103 and 105 each be approximately one half the value of the line impedance Zo, clearly other values could be used. For example, resistors 101, 103 and 105 might have any value between one-fifth and four-fifths the value of impedance Zo, the resistor value simply affecting the level to which line voltage rises prior to parallel inductors 102, 104 and 106 becoming fully conductive. Furthermore, clearly, according to the methodology above, there will be a range of inductor values which can be used for inductors 102, 104 and 106 which will achieve the desired goals and the invention should not be limited to the preferred values identified above.

To apprise the public of the scope of this invention, we make the following claims:

We claim:

1. An apparatus for eliminating reflected line voltages on the supply lines of an AC motor, the motor having three stator windings, each stator winding connected separately to a voltage source by a first, second or third supply line, respectively, the voltage source supplying high frequency voltage pulses on each supply line, each supply line having a characteristic line impedance, the apparatus comprising:

first, second and third electrically resistive elements positioned in series with the first, second and third supply lines between the source and the stator windings, respectively, each resistive element having an impedance which is between one-fifth and four-fifths the resistance of the line impedance each of the resistive element resistances being essentially identical;

first, second and third inductors linked in parallel to the first, second and third resistive elements, respectively, to form first, second and third filter elements, respectively; and a common mode choke linked to each of the first, second and third supply lines.

2. The apparatus of claim 1 wherein each resistive element has a resistance which is essentially one-half the line resistance.

3. The apparatus of claim 2 wherein the voltage source includes a plurality of switches and a DC bus voltage source including positive and negative DC rails, the switches linking the supply lines to the positive and negative rails such that when a switch is turned on, an associated supply line is linked to either the positive or negative DC rail to generate the high frequency voltage pulses, the switches characterized by a rise time trise which is the time it takes for a voltage pulse generated by the switch to increase from 10% value of the DC rail value to 90% of the DC rail value, a rise time frequency fu being 1/(pie *trise), the inductors chosen such that at rise time frequency fu, each inductor operates essentially like an open circuit.

4. The apparatus of claim 3 wherein the source includes a pulse width modulating controller which compares modulating signals to a high frequency carrier signal to generate firing signals which are in turn used to generate the high frequency voltage pulses, the carrier signal having a carrier frequency fc, the inductors chosen such that at the carrier frequency, each inductor operates essentially like a closed circuit.

5. The apparatus of claim 4 wherein the modulating signal has a fundamental frequency fm, the inductors chosen such that at the fundamental frequency fm, each inductor operates essentially like a closed circuit.

6. The apparatus of claim 3 wherein the source includes a pulse width modulating controller which compares modulating signals to a high frequency carrier signal to generate firing signals which are in turn used to generate the high frequency voltage pulses, the modulating signal having a fundamental frequency fm, the inductors chosen such that at the fundamental frequency fm, each inductor operates essentially like a closed circuit.

7. The apparatus of claim 1 wherein a choke inductance associated with each line reduces common mode transient currents to a level below a threshold level wherein the threshold level is a level at which electrical components fail.

8. The apparatus of claim 7 wherein the threshold level is below 4 amps/usec.

9. The apparatus of claim 8 wherein the level is below 2 amps/usec.

* * * * *